United States Patent [19]
Stuelpnagel

[11] 3,782,167
[45] Jan. 1, 1974

[54] ONBOARD CALIBRATION AND TEST OF AIRBORNE INERTIAL DEVICES

[75] Inventor: John C. Stuelpnagel, Baltimore, Md.

[73] Assignee: Westinghouse Electric Corporation, Pittsburgh, Pa.

[22] Filed: Nov. 5, 1971

[21] Appl. No.: 196,067

[52] U.S. Cl. ................................................. 73/1 E
[51] Int. Cl. ............................................ G01c 25/00
[58] Field of Search .............................. 73/1 D, 1 E

[56] References Cited
UNITED STATES PATENTS
2,954,691  10/1960  Fulcher .............................. 73/1 D
3,164,978   1/1965  Sharman et al. ................... 73/1 E

*Primary Examiner*—S. Clement Swisher
*Attorney*—F. H. Henson et al.

[57] ABSTRACT

A system and method for mounting an inertial instrument, such as a reference gyro, an accelerometer triad, or an inertial platform in an aircraft so that the instrument can be tested and calibrated on board the aircraft in its final mounting position without the necessity of test flying the aircraft for such calibration purposes. The inertial instrument is mounted for rotation about an axis angularly displaced with respect to reference axes of the aircraft so that the attitude of the instrument with respect to the reference axes of the aircraft can be changed by rotating the instrument about its mounting axis. The degree of angular movement of the instrument is detected and a theoretical output for the instrument is calculated by an onboard computer. This calculated output is then compared by the computer to the actual instrument output signal. The difference between the calculated signal and the actual signal can then be used to determine whether the instrument is suitable for use on the aircraft. In addition, the difference between the calculated signal and the actual output signal from the instrument can be used to calibrate the instrument and provide a correction signal thereto during normal operation of the instrument.

18 Claims, 3 Drawing Figures

ONBOARD CALIBRATION AND TEST OF AIRBORNE INERTIAL DEVICES

BACKGROUND OF THE INVENTION

1. Field of the Invention

This invention relates to aircraft instruments. In one of its aspects, the invention relates to a system and method for mounting instruments within aircraft and the like so that onboard tests of such instruments can be conducted and calibration of the instrument can be achieved without the necessity of removing the instruments or flying the aircraft for the purpose of testing and calibrating the instruments.

2. Background of the Invention

Inertial devices, such as attitude reference gyros, inertial platforms and accelerometer triads are commonly used in aircraft instruments to sense inertial and directional changes of the aircraft. Such devices are currently firmly fixed to the frame of the airplane. Testing of such devices usually occurs prior to the installation in the aircraft. A further test of the installed device has heretofore been performed by making a test flight and testing the performance of the device against test equipment. The instruments must then be removed for calibration and remounted in the aircraft. Because of this expensive and tedious procedure, calibration of these devices seldom takes place after the instrument has been installed in the aircraft.

BRIEF STATEMENT OF THE INVENTION

According to the invention, an inertial device or instrument is mounted within a frame on an aircraft which permits onboard testing of the inertial instrument. The instrument is mounted for movement, preferably by rotation, in the frame of the aircraft. The attitude of the instrument with respect to the inertial or reference axes of the airplane is changed as the instrument is rotated about its mounting axis. Means, such as a synchro, detect the degree of movement or rotation of the instrument on the mounting axis from a reference position and generate a signal responsive thereto. The signal is applied to an onboard computer which then computes the theoretical output for the instrument based on the degree of movement of the instrument with respect to the airplane reference axes. The inertial instrument generates an output signal representative of the degree of movement of the instrument from the reference position and this output signal is applied to the computer which compares it to the calculated signal. An error signal based on the difference between the calculated signal and the actual output signal from the instrument is generated from the computer and used to actuate a test display to indicate the degree of error for the inertial instrument or to indicate whether the instrument performs within specified limits.

Alternately, or in addition to the test function, the error signal can be used to calibrate the inertial instrument. The computer calculates a corrective signal for the output of the inertial instrument and applies the corrective signal to the output signal, producing a corrected output signal, when the inertial instrument has been returned to its reference position and is operating normally in connection with the aircraft.

Further, according to the invention, there is provided a method for testing an inertial instrument in place onboard an aircraft and the like. The inertial instrument is movably mounted onboard an aircraft on an axis which is displaced angularly from an inertial or reference axis of the aircraft so that movement of the instrument alters the attitude of the instrument with respect to the inertial axis. The instrument is moved away from a reference position on the mounting axis and the instrument generates an output signal representative of the shift of the aircraft from a reference position. The degree of movement of the instrument with respect to the reference position is detected and used for computing a theoretical output for the inertial device. The computed theoretical output is then compared with the actual output from the instrument and an error signal representative of the difference is generated therefrom, the error signal being used for determining the accuracy of the instrument and/or for calibration of the instrument in normal operation.

BRIEF DESCRIPTION OF THE DRAWINGS

The invention will now be described with reference to the accompanying drawings in which.

DETAILED DESCRIPTION OF THE PREFERRED EMBODIMENT

Figure 1:
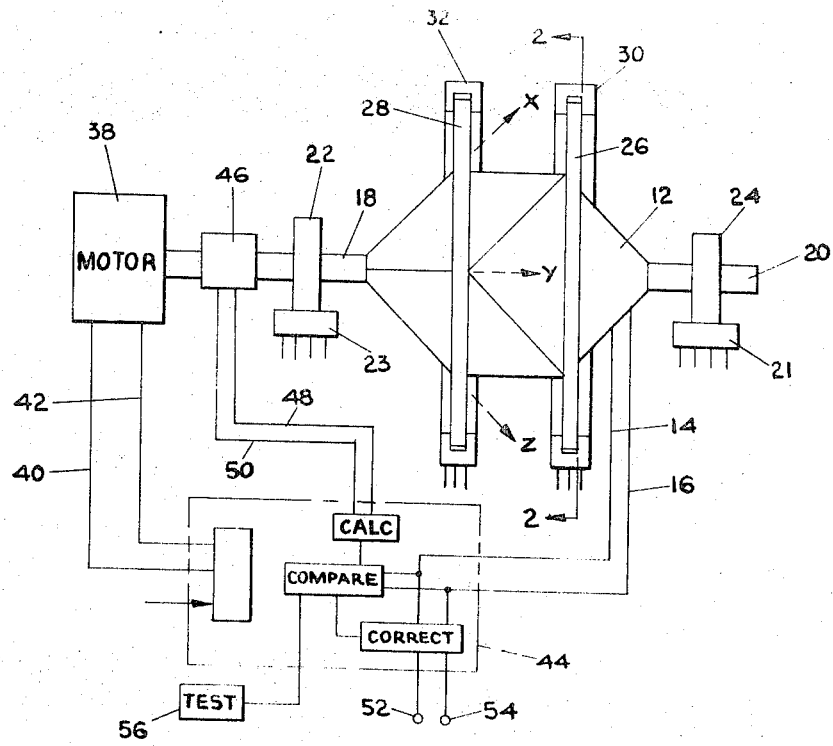
FIG. 1 is a schematic representation of the system according to the invention.
Figure 2:
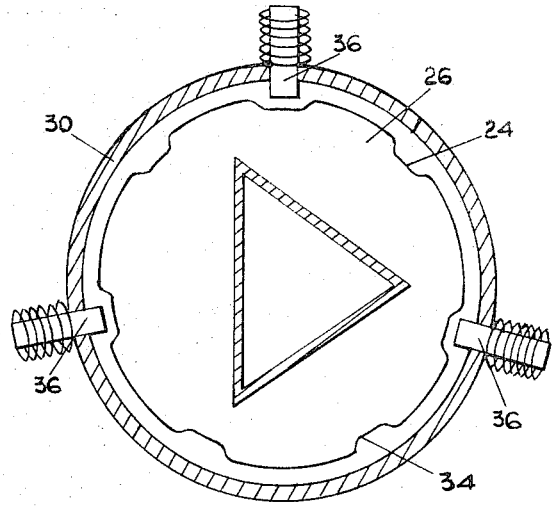
FIG. 2 is a view taken along lines 2—2 of FIG. 1.

Referring now to the drawings, and to FIGS. 1 and 2 in particular, there is disclosed a system for mounting an inertial instrument or device 12 having a pair of output leads 14 and 16. The instrument is mounted on shafts 18 and 20 having bearings 22 and 24 mounted firmly to the frame parts 21 and 23, respectively, whereby the inertial instrument is rotatably mounted on shafts 18 and 20. The inertial instrument 12 is represented as a box-like structure with the inertial mechanism, such as a gyro, being mounted within the box 12. Such mechanisms are well known and need no further description herein. As seen in FIG. 1, the shafts 18 and 20 are mounted at diagonally opposite corners of the box so that the axis of rotation passes diagonally through the box.

Guide plates 26 and 28 are mounted on the box perpendicular to the axis of rotation passing through shafts 18 and 20. The guide plates 26 and 28 ride in tracks 30 and 32 respectively to secure the inertial device 12 in a properly mounted position. The tracks 30 and 32 are fixed to the aircraft frame. Each of the plates 26 and 28 has a plurality of indentations 34 as seen best in FIG. 2. Solenoid-operated lugs 36 are positioned around the outside of the tracks 30 and 32 to engage the indentations 34 when the inertial device 12 is properly aligned within the aircraft and normally operating.

The box is normally aligned with the reference axes of the aircraft. For purposes of illustration, the axis "X" represents the direction of flight of the aircraft and passes through the front of the aircraft, the axis "Y" represents a direction out of the right wing of the aircraft, and the direction "Z" represents a direction vertically down. The instrument 12 is aligned with the reference or inertial axes of the aircraft when its three edges which are concurrent at shaft 18 are aligned with the forward, right wing, and directions, respectively, of the aircraft.

A torquing motor 38, such as a servo motor, is attached to shaft 18 to actuate rotation of the inertial instrument 12 on the shafts 18 and 20. Leads 40 and 42 electrically couple the motor 38 to a computer 44. Output leads 14 and 16 from the instrument 12 are electrically coupled to a comparator and a corrector of the computer 44. An angular pick-off device 46, such as a syncho, is mounted on shaft 18 to give an output signal based on the angular relationship of the shaft 18 with respect to a reference position when the instrument is aligned with the reference axes of the aircraft. The pick-off 46 has leads 48 and 50 which electrically couple it to a calculator of the computer 44. The calculator computes a theoretical output for the instrument 12 and applies a signal representative thereof to the comparator. An error signal representative of the difference between the theoretical output and the actual output is applied to the test indicator 58 and to the corrector. The test indicator has a dial (not shown) or a light which indicates the magnitude of the error signal. The corrector compensates the output signal of the instrument 12 so that a corrected output for the instrument 12 appears at output terminals 52 and 54.

Figure 3:
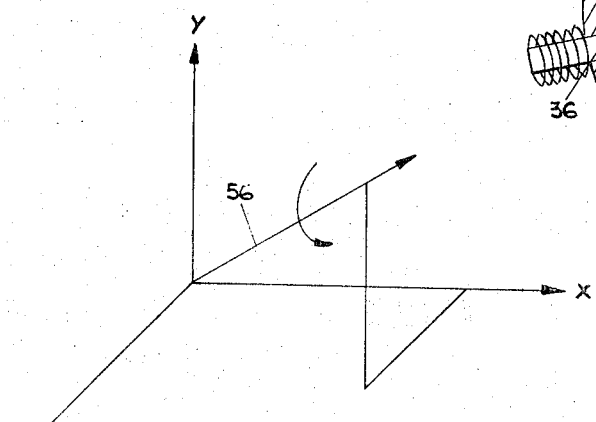
FIG. 3 is a schematic representation of the relationship between the axis of rotation of the inertial device mounting means and the axes of the airplane.

In FIG. 3, the relationship between the reference axes of the instrument 12, the axis of rotation 56 of the instrument, and the reference axes of the airplane is illustrated. In normal operations of the instrument 12, the instrument is aligned with the forward direction of the airplane, represented by the "X" axis, a direction out the right wing of the airplane, represented by the "X" axis, a direction out the right wing of the airplane, represented by the "Y" axis, and with the vertically down direction, represented by the "Z" axis. As seen in FIG. 3, the axis of rotation 56 of the instrument 12 makes an acute angle with the X, Y, and Z axes. Therefore rotation of the instrument 12 about axis 56 will change the attitude of the instrument 12 with respect to each axis of the aircraft. This angular relationship permits testing of the inertial instrument 12 with respect to each axis of the aircraft.

In the event that the instrument is to be tested with respect only to one or two axes of the aircraft, the axis of rotation of the instrument need be angularly disposed only to the particular test axis or axes.

In operation, the inertial instrument 12 is mounted on shafts 20 and 18 within the aircraft so that the reference edges of the inertial device 12 are properly aligned with the forward, right wing, and down directions, respectively, of the airplane. The computer and the inertial instrument are turned on and a time-out provided to permit all equipment to warm up, as required. It is assumed that intially the inertial device is positioned at a nominal starting point and, for example, that it is oriented with respect to local vertical. The computer then samples the outputs of the inertial device and these outputs may be compared with known calibrations or checked against known specifications, if desired. For example, an appropriate input may be provided indicating that the airplane has been levelled correctly, such as by levelling jacks, and thus this initial sampling function permits a check on the initial erection and static accuracy of an inertial device such as a vertical gyroscope. It is, of course, important that the system operate with respect to local vertical or at least that the departure from local vertical is known in performing the testing and establishing calibrations.

The computer then generates a command to the torque driver represented by motor 38, i.e., it appropriately signals the motor 38, to rotate the shaft 18 and thus to rotate the inertial device 12 through a given angle $t$, taken to represent the rotation angle and thus $t_o = 0$ represents the initial position. In the following discussion, it is furthermore assumed that a rotation angle $t$ is measured in a positive clockwise direction locking along the axis from shaft 18 to shaft 20. The exact angular rotation of the shaft 18 is detected by the synchro 46 and a signal representative of the angular rotation of shaft 18 is transmitted to the computer 44 through leads 48 and 50.

The rotation matrix describing the attitude of the instrument relative to the attitude at $t = 0$ is given by the following equation:

$$A_c = \begin{matrix} \frac{1+2\cos t}{3} & \frac{1+2\cos(t+120°)}{3} & \frac{1+2\cos(t-120°)}{3} \\ \frac{1+2\cos(t-120°)}{3} & \frac{1+2\cos t}{3} & \frac{1+2\cos(t+120°)}{3} \\ \frac{1+2\cos(t+120°)}{3} & \frac{1+2\cos(t-120°)}{3} & \frac{1+2\cos t}{3} \end{matrix}$$

(1)

From this information, the theoretical outputs from the inertial instrument 12 for heading, pitch, and roll can then be calculated by the computer.

The actual output from the device 12 is sensed by computer 44 and compared with the calculated values. More specifically, and utilizing conventional notations where $\psi_o$, $\beta_o$, $\phi_o$ are the Euler angle outputs of heading, pitch and roll, respectively, at $t = 0$, then the relationship $$A_d = A_c \, (\phi)_x \, (\beta)_y \, (\psi)_z \, (\psi)^{-1}_z \, (\beta)^{-1}_x \, (\phi)^{-1}_x$$

(2)

should hold continuously. In other words, this value $A_d$ denotes the orientation of the inertial device as measured by that device itself, whereas the value $A_c$ from Equation (1) is the mathematically calculated attitude of the instrument relative to the attitude at $t = 0$. Assuming perfect functioning of the inertial device, the values $A_c$ and $A_d$ therefore correspond throughout the range of values of $t$.

Any error present in the output of the inertial device relative to the mathematically accurate and calculated value thereof accordingly may be represented by the following matrix equations for the value E.

$$E = A_c \, (\phi)_x \, (\beta)_y \, (\psi)_z - (\psi)_x \, (\beta)_y \, (\psi)_z \, .$$

(3)

In the foregoing equations, of course, the subscript $o$ represents the initial values at $t = 0$ and the absence of any subscript represents the value at any given angle $t$. In Equation (3), the second righthand term represents the outputs of the inertial device at any given angle $t$ and the first righthand term represents the outputs at the initial position or $t = 0$ multiplied (conventional matrix multiplication) by the calculated value $A_c$ (produced by the computer and as defined and established in accordance with Equation (1) above) to correct for any offset from local vertical.

A measure of the deviation of the device performance from perfect or ideal performance may then be provided by deriving the quantity $TrE^TE$ where, in conventional fashion, Tr denotes the trace operator and the superscript "T" denotes the transposed matrix E, E in each instance being derived from Equation (3). As is well known, the trace operator is the sum of the diagonal elements of the product of the matrix E with the transposed matrix and comprises the sum of the squares of the terms of that matrix E. Generally, this computation comprises a single numeric value which enables comparison with a single predetermined level establishing the requisite performance conditions.

The tests can be, and typically are, repeated for different angular relationships of the shaft 18; further, they are usually conducted statically. In general, an error signal is generated by the computer, the error signal being representative of the difference between the calculated value and the actual output value. The error signal is supplied to a test instrument 56 which may reflect the preestablished requisite level of accuracy, to determine whether the instrument 12 is suitably calibrated or accurate enough for inclusion on the aircraft.

After the test is concluded, the axis 18 is returned by the motor 38 to the zero position and the lugs 36 are actuated to engage the indentations 34 in the plates 26 and 28.

If the differences between the actual output of device 12 and the calculated values for the particular angular relationship exceed predetermined values, then the device 12 can be removed after the test for repair or replacement. On the other hand, if the deviation from the theoretical values follows a particular function which can be computed by the computer 44, then the computer 44 can modify the output from the inertial device 12 in accordance with the predetermined function, through computer 44, to produce a corrected output signal on leads 52 and 54.

The inertial device 12 can be any type of aircraft device which senses the attitude, pitch, roll, acceleration or inertia of the aircraft. Examples of such devices are attitude gyros, accelerometers, and inertial platforms.

In the case of an accelerometer triad, the calibration may be accomplished in the following manner using the subject mounting structure. If $\hat{\alpha}$ is a unit vector representing an accelerometer axis when $t = 0$, and $\hat{z}$ represents a unit vector along the vertical, then $\hat{\alpha}^T A^T \hat{z}$ is the output, in g's, which should be read for the accelerometer when in an attitude specified by the matrix A. By comparison of the sampled value with the computed value, a go/no-go test can be performed first, followed by a calibration if the errors are all within acceptable bounds.

The computer 44 can be any suitable computer capable of making the abovedescribed calculations and comparisons. An example of a suitable computer is the Westinghouse Airborne Digital Signal Processor No. 1802 manufactured by Westinghouse Electric Corporation.

In summary, the system of the invention operates to test and to calibrate the inertial device without the necessity of a test flight merely for the purpose of calibrating instruments. The calibration and testing of the inertial devices takes place in a very simple and accurate manner which has not been heretofore possible onboard the aircraft. It is to be appreciated that the primary feature of the invention is the capability of the mounting system for modifying the attitude of an inertial device while installed; accordingly, the invention is not limited to the specific nature of the test described but permits the foregoing exemplary tests or similar such tests to be conducted.

Reasonable variation and modification are possible within the scope of the foregoing disclosure, the drawings, and the appended claims without departing from the spirit of the invention.

What is claimed is:

1. A system for testing an inertial instrument for use in aircraft and the like, said inertial instrument generating an output signal which is a function of the orientation of said inertial instrument with respect to a given reference position in inertial space, said system comprising:

means for mounting said instrument in an aircraft for movement about a mounting axis such that the attitude of said inertial instrument changes with respect to at least one reference axis of said aircraft when said inertial instrument is rotated about said mounting axis;

means for rotating said instrument about said mounting axis through a desired angle;

means for detecting the rotation of said instrument from a reference position on said axis and producing an output representative thereof;

computing means responsive to the output of said detecting means for calculating a theoretical output of said inertial instrument as a result of said movement of said instrument from said reference position to any given angle; and said computing means receives the output of said instrument and compares that output with the calculated output for generating an error signal representative of any difference between the calculated output and the instrument output.

2. A system according to claim 1 wherein said inertial instrument is an inertial platform.

3. A system according to claim 1 wherein said inertial instrument is a reference gyro.

4. A system according to claim 1 wherein said inertial instrument is an accelerometer triad.

5. A system according to claim 1 wherein said mounting axis is at an acute angle to the heading, right wing, and vertical axis of the aircraft.

6. A system according to claim 1 wherein the calculated output is defined by the matrix equation:

$$A = \begin{array}{ccc} \dfrac{1+2\cos t}{3} & \dfrac{1+2\cos(t+120°)}{3} & \dfrac{1+2\cos(t-120°)}{3} \\ \dfrac{1+2\cos(t-120°)}{3} & \dfrac{1+2\cos t}{3} & \dfrac{1+2\cos(t+120°)}{3} \\ \dfrac{1+2\cos(t+120°)}{3} & \dfrac{1+2\cos(t-120°)}{3} & \dfrac{1+2\cos t}{3} \end{array}$$

7. A system for mounting an inertial instrument according to claim 1 and furhter comprising indicator means coupled to said comparing means for indicating said difference between said calculated output and said instrument output.

8. A system for mounting an inertial instrument according to claim 1 and further comprising means responsive to the error output of said comparator means and to said instrument output for correcting said instrument output signal and thereby providing a corrected output signal of said inertial instrument.

9. A system for mounting an inertial instrument according to claim 1 and further comprising guide means fixed to said inertial instrument perpendicular to said mounting axis to maintain said inertial instrument in a fixed position along said mounting axis.

10. A system for mounting an inertial instrument according to claim 1 and further comprising releasable means for securing said inertial device in an aligned position with respect to the reference axes of said aircraft for normal operation of said inertial instrument.

11. In an aircraft having an inertial instrument for indicating the orientation of said aircraft with respect to inertial space, means for testing said inertial instrument while mounted within said aircraft comprising:
   a frame adapted to be secured to said aircraft and including means mounting said instrument in said frame for selectively positioning said instrument in alignment with a reference axis of said aircraft and permitting movement of said instrument to change the attitude thereof relative to said reference axis;
   means for moving said instrument with respect to said reference axis;
   means for detecting the position of said instrument relative to an initial position, with respect to said reference axis and producing an output representative thereof; and
   computing means responsive to the output of said detecting means for calculating the theoretical output of said instrument as a function of the position thereof relative to the initial position, and said computing means including means for comparing said calculated output with said output from said instrument for generating an error signal corresponding to the difference between said calculated output and said instrument output.

12. An aircraft having an inertial instrument according to claim 11 and further comprising indicator means coupled to said comparing means for providing a visual indication of said difference between said calculated output and said instrument output.

13. An aircraft having an inertial instrument according to claim 11 wherein said computing means further comprises corrector means responsive to said error signal and said instrument output signal for producing a corrected output signal for said inertial instrument.

14. An aircraft having an inertial instrument according to claim 11 and further including means for releasably fixing said instrument in a position aligned with said reference axis.

15. A method for mounting an inertial instrument within an aircraft and the like to permit testing and calibration of the inertial instrument, onboard the aircraft, said method comprising the steps of:
   mounting said inertial instrument onboard said aircraft for rotational movement about an axis of rotation which is displaced angularly from an inertial axis of said aircraft, and wherein, in an initial position, an axis of said instrument is aligned with an inertial axis of said aircraft;
   rotating said instrument from the initial position, thereby to simulate an attitude of said aircraft different from the reference position in inertial space, said instrument generating an output signal responsive to the rotation thereof from said initial position;
   detecting the rotational position of said instrument about said axis with respect to the initial position;
   computing the theoretical output of said inertial instrument for the detected position, relative to said initial position thereof; and
   comparing the computed theoretical output with the actual output from the instrument to generate an error signal representative of the difference between said computed theoretical output and the actual output of said instrument.

16. A method for testing an inertial instrument onboard an aircraft according to claim 15, further comprising the step of comparing the error signal with a predetermined value to determine whether said instrument is operable within an acceptable limit.

17. A method for testing an inertial device onboard an aircraft according to claim 15, further comprising: computing a correction signal for said instrument output in accordance with said error signals generated in the rotational movement thereof to a number of positions relative to the initial position, returning said inertial instrument to said initial position for alignment with said inertial axis of said airplane; and correcting said output of said inertial instrument by said correction signal to produce a corrected output signal from said inertial instrument.

18. A method for testing an inertial instrument onboard an aircraft according to claim 17, further comprisng securing said inertial instrument in said aligned position upon return thereto.

* * * * *